US006451877B1

(12) United States Patent
Sawada et al.

(10) Patent No.: US 6,451,877 B1
(45) Date of Patent: Sep. 17, 2002

(54) RESIN COMPOSITION FOR USE IN CATIONIC ELECTRODEPOSITION COATING COMPOSITION

(75) Inventors: Hidenori Sawada; Akihiko Shimasaki, both of Kanagawa-ken (JP)

(73) Assignee: Kansai Paint Co., Ltd. (JP)

( * ) Notice: Subject to any disclaimer, the term of this patent is extended or adjusted under 35 U.S.C. 154(b) by 65 days.

(21) Appl. No.: 09/745,485

(22) Filed: Dec. 26, 2000

(51) Int. Cl.$^7$ ................................................. C08K 3/20
(52) U.S. Cl. ........................ 523/415; 523/400; 523/402; 523/406
(58) Field of Search ................................ 523/400, 402, 523/406, 415

(56) References Cited

U.S. PATENT DOCUMENTS

| 4,526,945 A | 7/1985 | Carlson et al. |
| 4,694,054 A | 9/1987 | Janowicz |
| 4,837,326 A | 6/1989 | Lin et al. |
| 4,886,861 A | 12/1989 | Janowicz |
| 5,324,879 A | 6/1994 | Hawthorne |

FOREIGN PATENT DOCUMENTS

| JP | 44906/86 | 3/1986 |
| JP | 23209/94 | 2/1994 |
| JP | 35411/95 | 2/1995 |
| JP | 19172/96 | 1/1996 |
| JP | 60045/96 | 3/1996 |
| JP | 501457/97 | 2/1997 |
| JP | 176256/97 | 7/1997 |
| JP | 510499/97 | 10/1997 |
| WO | WO 95/17435 | 6/1995 |

OTHER PUBLICATIONS

*Macromolecules*, 1996, 29, 8083 to 8091 (Suddaby et al.).

Primary Examiner—Edward J. Cain
(74) Attorney, Agent, or Firm—Fisher, Christen & Sabol

(57) ABSTRACT

A resin composition used in an electrodeposition coating composition and containing an amine-modified vinyl resin (A) prepared by addition reaction of a secondary amine to an epoxy group-containing vinyl copolymer obtained by copolymerizing 2 to 30 parts by weight of an epoxy group-containing polymerizable unsaturated monomer (a-1) and 70 to 98 parts by weight of other polymerizable unsaturated monomer (a-2) copolymerizable with the monomer (a-1) by a catalytic chain transfer polymerization and having a weight average molecular weight of 2,000 to 20,000, and a blocked polyisocyanate (B).

8 Claims, No Drawings

RESIN COMPOSITION FOR USE IN CATIONIC ELECTRODEPOSITION COATING COMPOSITION

BACKGROUND OF THE INVENTION (1) Field of the Invention

The present invention relates to a resin composition used in an electrodeposition coating composition and capable of forming an electrodeposition coating film showing good properties in corrosion resistance, finish appearance and weather resistance.

(2) Description of Background Art

A cationic electrodeposition coating composition consisting of a combination of an epoxy resin with a blocked polyisocyanate as a resin component has a strong anti-corrosive power and has widely been used in the art. However, in the field of an industrial coating such as in electrical appliances, one coat electrodeposition coating finish is demanded to obtain a coating film showing good properties in coating film finish appearance and weather resistance in addition to corrosion resistance.

For example, Japanese Patent Publication No. 44906/86, Japanese Patent Application Laid-Open No. 60045/96, etc. disclose an acrylic resin composition used in a cationic electrodeposition coating composition and capable of forming a coating film showing good properties in corrosion resistance and weather resistance. Japanese Patent Publication No. 44906/86 discloses an acrylic resin composition used in a cationic electrodeposition coating composition and consisting of a reaction product of an epoxy group-containing vinyl copolymer obtained by the normal solution radical polymerization with a secondary amine, and a reaction product of an epoxy resin esterified with an unsaturated fatty acid or added with a secondary amine with a partly blocked polyisocyanate. Japanese Patent Application Laid-Open No. 60045/96 discloses a resin composition used in a cationic electrodeposition coating composition and containing an acrylic resin prepared by amine-modifying a glycidyl group of a glycidyl group-containing copolymer obtained by the normal solution radical polymerization, and a blocked polyisocyanate.

However, these acrylic resin compositions have such a problem as to result an unsatisfactory finish appearance.

For the purpose of improving a finish appearance of a coating film, use of an acrylic resin prepared by the use of a mercaptan-based chain transfer agent, having a relatively small molecular weight and showing good flowability on heat curing an electrodeposition coating film is proposed, resulting in producing such a problem that the mercaptan remaining in the resulting coating film may reduce the corrosion resistance of the coating film.

SUMMARY OF THE INVENTION

It is an object of the present invention to provide a resin composition used in the electrodeposition coating composition and capable of forming a coating film showing good properties in corrosion resistance, finish appearance and weather resistance.

That is, the present invention provides a resin composition used in an electrodeposition coating composition and containing an amine-modified vinyl resin (A) prepared by addition reaction of a secondary amine to an epoxy group-containing vinyl copolymer obtained by copolymerizing 2 to 30 parts by weight of an epoxy group-containing polymerizable unsaturated monomer (a-1) and 70 to 98 parts by weight of other polymerizable unsaturated monomer (a-2) copolymerizable with the monomer (a-1) by a catalytic chain transfer polymerization and having a weight average molecular weight of 2,000 to 20,000, and a blocked polyisocyanate (B).

The present invention also provides a resin composition used in an electrodeposition coating composition and further containing an amine-modified epoxy resin (C).

DETAILED DESCRIPTION OF THE INVENTION

The resin composition used in the electrodeposition coating composition in the present invention contains the following amine-modified vinyl resin (A) and a blocked polyisocyanate (B).

The amine-modified vinyl resin (A) is a resin prepared by an addition reaction of a secondary amine to an epoxy group-containing vinyl copolymer obtained by copolymerizing an epoxy group-containing polymerizable unsaturated monomer (a-1) and other polymerizable unsaturated monomer (a-2) copolymerizable with the monomer (a-1) by a catalytic chain transfer polymerization.

Epoxy Group-Containing Polymerizable Unsaturated Monomer (a-1)

The epoxy group-containing polymerizable unsaturated monomer (a-1) is a monomer used for the purpose of introducing epoxy group into a copolymer, and may include, as typical examples, glycidyl (meth)acrylate, 3,4-epoxycyclohexyl (meth)acrylate, β-methylglycidyl (meth)acrylate, allylglycidyl ether, and the like. In the present invention, "(meth)acrylate "means "acrylate or methacrylate".

Other Polymerizable Unsaturated Monomer (a-2)

Other polymerizable unsaturated monomer (a-2) is a monomer copolymerizable with the epoxy group-containing polymerizable unsaturated monomer (a-1) and other than the epoxy group-containing polymerizable unsaturated monomer (a-1).

Typical examples of other polymerizable unsaturated monomer (a-2) may include $C_{1-24}$ alkyl (meth)acrylate having a alkyl straight chain, a branched alkyl chain or a cyclic alkyl group, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, 2-ethylhexyl (meth)acrylate, n-octyl (meth)acrylate, lauryl (meth)acrylate, tridecyl (meth)acrylate, stearyl meth(acrylate), cyclohexyl (meth)acrylate, isobornyl (meth)acrylate, tricyclodecanyl (meth)acrylate, dicyclopentenyl (meth)acrylate, dicyclopentenyloxyethyl (meth)acrylate and the like; carboxyl group-containing polymerizable unsaturated monomer or polymerizable unsaturated group-containing acid anhydride such as (meth)acrylic acid, maleic acid, maleic anhydride and the like; hydroxyl group-containing polymerizable unsaturated monomer such as 2-hydroxyethyl (meth)acrylate, hydroxypropyl (meth)acrylate, 4-hydroxybutyl (meth)acrylate and the like; (meth)acrylamide or derivatives thereof, for example, N,N-dimethylaminoethyl (meth)acrylamide, N,N-diethylaminoethyl (meth)acrylamide, N,N-dimethylaminopropyl (meth)acrylamide, N-methylol acrylamide methyl ether, N-methylol acrylamide butyl ether and the like; oxetane ring-containing ethylenicaly unsaturated monomer such as 3-ethyl-3-methacryloyloxymethyl oxetane, 3-methyl- 3-methacryloyloxymethyl oxetane, 3-butyl-3-methacryloyloxymethyl oxetane and the like; (meth)acrylonitrile, styrene, vinyl acetate, piperidinyl-containing (meth)acrylate, for example, FA-711MM and FA-712HM (trade names, marketed by Hitachi Chemical Co., Ltd. respectively), fluorine-containing alkyl (meth) acrylate, siloxane chain-containing (meth)acrylate, isocyanato group-containing monomer, alkoxysilyl group-containing (meth)acrylate, and the like. These polymerizable unsaturated monomers may be used alone or in combination.

In the present invention, the epoxy group-containing vinyl copolymer may be obtained by copolymerizing an epoxy group-containing polymerizable unsaturated monomer (a-1) and other polymerizable unsaturated monomer (a-2) according to the catalytic chain transfer polymerization (CCTP).

The catalytic chain transfer polymerization is a polymerization such as a solution polymerization in an organic solvent, an emulsion polymerization in water, or the like of a polymerizable unsaturated monomer in the presence of a metal complex as a catalytic chain transfer agent and a radical polymerization initiator as disclosed, for example, in Japanese Patent Publication Nos. 23209/94 and 35411/95, Japanese Patent Published No. 501457/97, Japanese Patent Application Laid-Open No. 176256/97, Macromolecules 1996, 29, 8083–8089, etc.

The metal complex may include, for example, cobalt complex, iron complex, nickel complex, ruthenium complex, rhodium complex, palladium complex, rhenium complex, iridium complex and the like. Of these, the cobalt complex effectively acts as the chain transfer agent to be preferable.

The cobalt complex may include ones disclosed in, for example, Japanese Patent Publication Nos. 23209/94 and 35411/95, U.S. Pat. Nos. 4526945, 4694054, 4837326, 4886861 and 5324879, WO95/17435, Japanese Patent Published No. 510499/97 and the like. Specific examples thereof may include bis (borondifluorodimethyldioxyiminocyclohexane) Co(II), bis (borondifluorodimethylglyoxymate) Co(II), bis (borondifluorodiphenylglyoxymate) Co(II), Co(II) chelate of vicinaliminohydroxyimino compound, Co(II) chelate of tetraazatetraalkylcycyclotetradecatetraene, N,N'-bis (salicylidene) ethylene diaminocobalt(II) chelate, Co(II) chelate of dialkyldiazadioxodialkyldodecadiene, cobalt (II) porphyrin complex and the like. Of these, bis (borondifluorodiphenylglyoxymate) Co(II), bis (borondifluorodimethylglyoxymate) Co(II), etc. are easily available and preferable.

As disclosed in, for example, Japanese Patent Publication No. 19172/96, such a complex that a group making possible a radical cleavage is bonded directly to a metal may be used in place of the above metal complex. The group making possible the radical cleavage may include, for example, alkyl group, aryl group, heterocyclic group and the like, and may also include, for example, a substituted derivative making possible a homolytic fission from a metal ion by irradiation of a visible light or ultraviolet light, or by heating; a halogenized compound bonded to a chelate metal ion; other anionic ion, nitrile, ester, aromatic or substituted aromatic group substituted by a carbon atom bonded to a metal ion, and the like. In the case where the above complex is used, the use of the radical polymerization initiator may be unnecessary. In the present invention, an amount of the metal complex as the catalytic chain transfer agent on obtaining the epoxy group-containing vinyl copolymer according to the catalytic chain transfer polymerization is not particularly limited, but usually in the range of $1\times10^{-6}$ to 1 part by weight, particularly $1\times10^{-4}$ to 0.5 part by weight100 parts by weight of a total amount of the epoxy group-containing polymerizable unsaturated monomer (a-1) and other polymerizable unsaturated monomer (a-2).

For the purpose of controlling reactivity or improving solubility, a known coordination compound may optionally be used. Examples of the coordination compound may include phosphorus compounds such as triphenylphosphine, tributylphosphine and the like; amine compounds such as pyridine, tributylamine and the like, and the like.

The radical polymerization initiator used on preparing the epoxy group-containing vinyl copolymer according to the catalytic chain transfer polymerization in the present invention may include any radical polymerization initiator knownse, and typically may include, for example, the peroxide polymerization initiator such as cyclohexanone peroxide, 3,3,5-trimethylcyclohexanone peroxide, methylcyclohexanone peroxide, 1,1-bis(tert-butylperoxy)-, 3,3,5-trimethylcyclohexane, 1,1-bis(tert-butylperoxy) cyclohexane, n-butyl-4,4-bis(tert-butylperoxy) valerate, cumenehydroperoxide, 2,5-dimethylhexane-2,5-dihydroperoxide, 1,3-bis(tert-butylperoxy-m-isopropyl) benzene, 2,5-dimethyl-2,5-di(tert-butylperoxy)hexane, diisopropylbenzene peroxide, tert-butylcumyl peroxide, decanoyl peroxide, lauroyl peroxide, benzoyl peroxide, 2,4-dichlorobenzoyl peroxide, bis(tert-butylcyclohexyl) peroxydicarbonate, tert-butylperoxybenzoate, 2,5-dimethyl-2,5-di(benzoylperoxy)hexane and the like; and the azo polymerization initiator such as 2,2'-azobis (isobutyronitrile), 1,1-azobis(cyclohexane-1-carbonitrile), azocumene, 2,2'-azobismethylvaleronitrile, 4,4'-azobis (4-cyanovaleric acid), 2-(tert-butylazo)-2-cyanopropane, 2,2'-azobis (2,4,4-trimethylpentane), dimethyl-2,2'-azobis (2-methylpropionate) and the like. An amount of the radical polymerization initiator is not particularly limited, but usually in the range of 0.1 to 20 parts by weight, particularly 0.5 to 10 parts by weight 100 parts by weight of a total amount of the epoxy group-containing polymerizable unsaturated monomer (a-1) and other polymerizable unsaturated monomer (a-2).

The organic solvent used in the case where the copolymerization reaction according to the catalytic chain transfer polymerization in the present invention is carried out in an organic solvent is not particularly limited so long as the polymerizable unsaturated monomers (a-1) and (a-2), and the resulting epoxy group-containing vinyl copolymer can be dissolved or dispersed in the organic solvent, and specifically may include, for example, hydrocarbon solvent such as heptane, toluene, xylene, octane, mineral spirits and the like; ester solvent such as ethyl acetate, n-butyl acetate, isobutyl acetate, ethylene glycol monomethyl ether acetate, ethylene glycol monobutyl ether acetate and the like; ketone solvent such as methyl ethyl ketone, methyl isobutyl ketone, diisobutyl ketone, cyclohexanone and the like; alcohol solvent such as methanol, ethanol, isopropanol, n-butanol, sec-butanol, isobutanol and the like; ether solvent such as n-butyl ether, dioxane, ethylene glycol monomethyl ether, ethylene glycol monoethyl ether and the like; aromatic petroleum solvent such as Swasol 310, Swasol 1000, Swasol 1500 (respectively, trade names, marketed by Cosmo Oil Co., Ltd.), and the like.

The above organic solvent may be used alone in combination. An amount of the organic solvent is preferably in the range of 400 parts by weight or less100 parts by weight of a total amount of the polymerizable unsaturated monomers on polymerization reaction.

In the case where the epoxy group-containing vinyl copolymer is prepared in the organic solvent according to the catalytic chain transfer polymerization in the present invention, the polymerizable unsaturated monomers (a-1) and (a-2) are heated in the presence of the metal complex and radical initiator in the organic solvent to carry out copolymerization, and a temperature rise due to heat of polymerization reaction may preferably be controlled by the following methods, that is, (1) which comprises charging a reactor with a metal complex and organic solvent and mixing and dropping or separately dropping polymerizable unsaturated monomers and radical polymerization initiator in a predetermined period of time while stirring at a temperature of 60 to 200° C., and (2) which duplicates the above method (1) except for mixing and dropping or separately dropping a part or whole of he metal complex along with the polymerizable unsaturated monomers.

The epoxy group-containing vinyl copolymer prepared by the catalytic chain transfer polymerization in the present invention may have a weight average molecular weight in the range of 2,000 to 20,000, preferably 3,000 to 10,000. Copolymerization may be carried out by controlling an amount of the metal complex so that the weight average molecular weight may be within the above range. The epoxy group-containing vinyl copolymer usually has a number average molecular weight in the range of 1,000 to 10,000, and an epoxy equivalent in the range of about 500 to 5,000.

Amine-Modified Vinyl Resin (A)

The amine-modified vinyl resin (A) may be prepared by reacting the epoxy group-containing vinyl copolymer with a secondary amine.

The secondary amine may include, for example, N,N-diethylamine, N,N-dibutylamine, N-methylmonoethanolamine, N-ethylmonoethanolamine, N,N-diethanolamine and the like. Of these, a secondary amine containing hydroxyl group in the molecule, for example, N-methylmonoethanolamine, N-ethylmonoethanolamine, N,N-diethanolamine or the like, is preferable. An amount of the secondary amine to be reacted is preferably in the range of 0.7 to 1.1 equivalent one equivalent epoxy group in the epoxy group-containing vinyl copolymer. The resulting amine-modified vinyl resin (A) preferably has an amine value in the range of 12 to 120.

In the above reaction, an addition reaction of a secondary amino group to the epoxy group in the epoxy group-containing vinyl copolymer takes place, resulting in bonding of the secondary amine to the copolymer, consumption of epoxy group, and formation of hydroxyl group, usually secondary hydroxyl group. The amine-modified vinyl resin (A) is such that an amino group moiety may be neutralized with an acid so as to be cationizable.

Blocked Polyisocyanate (B)

The polyisocyanate as a starting material of the blocked polyisocyanate (B) may include organic polyisocyanates, for example, aliphatic diisocyanates such as lysine diisocyanate, hexamethylene diisocyanate, trimethylhexane diisocyanate and the like; alicyclic diisocyanates such as hydrogenated xylylene diisocyanate, isophorone diisocyanate, methylcyclohexane-2,4-(or 2,6)-diisocyanate, 4,4'-methylene bis(cyclohexyl isocyanate), 1,3-(isocyanatomethyl)cyclohexane and the like; aromatic diisocyanates such as tolylene diisocyanate, xylylene diisocyanate, diphenylmethane diisocyanate and the like; trivalent or higher polyisocyanates such as lysine triisocyanate; adducts of the respective organic polyisocyanates with polyhydric alcohol, low molecular weight polyester resin, water or the like, cyclic polymers between the respective organic diisocyanates, for example, isocyanurate, biuret type adducts, and the like.

The blocked polyisocyanate (B) may include ones prepared by blocking isocyanato group in the polyisocyanate with a blocking agent. The blocking agent may include, for example, phenols such as phenol, cresol, xylenol and the like; lactams such as ε-caprolactam, δ-valerolactam, γ-butyrolactam, β-propiolactam and the like; alcohols such as methanol, ethanol, n-or i-propyl alcohol, n-, i- or t-butyl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, benzyl alcohol and the like; oximes such as formamidoxime, acetoaldoxime, acetoxime, methyl ethyl ketoxime, diacetyl monoxime, benzophenone oxime, cyclohexane oxime and the like; active methylene-containing compounds such as dimethyl malonate, diethyl malonate, ethyl acetoacetate, methyl acetoacetate, acetyl acetone and the like; and the like. The polyisocyanate may be mixed with the blocking agent optionally in an organic solvent so that an isocyanato groups in the polyisocyanate may easily be blocked. The above polyisocyanates may be used alone or in combination.

The cationic electrodeposition coating composition of the present invention contains, as essential components, the amine-modified vinyl resin (A) and the blocked polyisocyanate (B), but may optionally contain an amine-modified epoxy resin (C).

Amine-modified epoxy resin (C)

The amine-modified epoxy resin is a resin prepared by reacting an epoxy resin with an amine, and may be cationized by neutralizing an amino group with an acid. The epoxy resin reacted with the amine is preferably a resin having one or more, preferably 2 or more on an average of epoxy group in one molecule, and a weight average molecular weight in the range of 350 to 8,000, particularly 400 to 4,000.

The above epoxy resin may include, for example, glycidyl ether type epoxy resin, glycidyl ester type epoxy resin, other glycidyl type epoxy resin; modified epoxy resins obtained by modifying the above epoxy resins with a modifier such as alkyl phenol, fatty acid and the like, and the like. The above epoxy resins may be made high molecular weight ones by use of a linking agent so as to be a preferable molecular weight.

The glycidyl ether type epoxy resin is a glyidyl ether group-containing epoxy resin prepared by reacting, for example, polyhydric alcohol or polyhydric phenol with epihalohydrin or alkylene oxide. Examples of the polyhydric alcohol may include ethylene glycol, diethylene glycol, triethylene glycol, polyethylene glycol, propylene glycol, polypropylene glycol, neopentyl glycol, butylene glycol, 1,6-hexanediol, 1,4-hexanediol, glycerin, sorbitol and the like. Examples of the polyhydric phenol may include 2, 2-bis(4-hydroxyphenyl) propane, i.e. bisphenol A, 2,2-bis(2-hydroxyphenyl) propane, 2-(2-hydroxyphenyl) 2-(4-hydroxyphenyl) propane, halogenated bisphenol A, bis(4-hydroxyphenyl) methane, i.e. bisphenol F, 4,4'-dihydroxybenzophenone, tris (4-hydroxyphenyl) propane, 1,1-bis(4-hydroxyphenyl)ethane, 4,4'-dihydroxybiphenol, resorcin, hydroquinone, tetrahydroxyphenylethane, 1,2,3-tris(2,3-epoxypropoxy) propane, phenol novolac type polyhydric phenol, cresol novolac type polyhydric phenol and the like.

The glycidyl ester type epoxy resin may include, for example, high molecular weight ones prepared from diglycidyl phthalate, diglycidyl hexahydrophthalate, diglycidyl tetrahydrophthalate, glycidyl dimerate and the like by use of a linking agent.

The other glycidyl type epoxy resin may include, for example, high molecular weight ones prepared from tetraglycidylaminodiphenylmethane, triglycidylisocyanurate and the like by use of a linking agent.

The modified epoxy resin is a resin prepared by modifying an epoxy resin such as the glycidyl ether type epoxy resin, glycidyl ester type epoxy resin and the like with a modifier such as alkyl phenol, fatty acid and the like.

The linking agent used in obtaining a suitable molecular weight of respective epoxy resins such as the glycidyl ether type epoxy resin, glycidyl ester type epoxy resin, other glycidyl type epoxy resin, modified epoxy resin and the like may include, for example, polyhydric phenol, polyhydric alcohol, polybasic acid, primary or secondary amine, polyisocyanate and the like. The above polyhydric alcohol and polyhydric phenol may include the polyhydric alcohol and polyhydric phenol used as the starting materials of the above glycidyl ether type epoxy resin. Examples of the polybasic acid may include adipic acid, azelaic acid, sebacic acid, hexahydrophthalic anhydride, tetrahydrophthalic anhydride, isophthalic acid, dimmer acid and the like. The primary and secondary amine may include, for example, ethylamine, n-propylamine, isopropylamine, n-butylamine, monoethanolamine, hexamethylenediamine and the like. The polyisocyanate may include, for example, isophorone diisocyanate, diphenylmethane diisocyanate, hexamethylene diisocyanate and the like.

The resin composition for use in the electrodeposition coating composition in the present invention contains the amine-modified vinyl resin (A), the blocked polyisocyanate (B), and optionally the amine-modified epoxy resin (C). A mixing ratio of the components (A), (B) and (C) is, from the standpoints of corrosion resistance, finish appearance, weather resistance, etc. of the resulting coating film, preferably such that the component (A) is in the range of 50 to 90 parts by weight, preferably 60 to 80 parts by weight, the component (B) is in the range of 10 to 50 parts by weight, preferably 20 to 40 parts by weight, and the component (C) is in the range of 0 to 30 parts by weight, preferably 10 to 20 parts by weight100 parts by weight of a total amount of the components (A) and (B) respectively.

The resin composition containing the above components (A), (B) and optionally (C) and used as the cationic electrodeposition coating composition in the present invention may usually be used in such a state as to be dispersed in an aqueous medium. Respective components (A), (B) and optionally (C) may be dispersed in an aqueous medium suitably by a method of cationizing amino group in the components (A) and optionally (C) with an acid. The acid may include, for example, formic acid, acetic acid, propionic acid, lactic acid, phosphoric acid and the like. A mixing amount of the acid may not particularly be limited, but usually is in such an amount that a neutralization equivalent of the amino group may be in the range of 0.2 to 1.2.

The aqueous medium may include water and a mixture of water with a water-miscible organic solvent, and may optionally contain an organic solvent non-miscible with water in a small amount. The water-miscible organic solvent may include, for example, ethylene glycol monoethyl ether, ethylene glycol monopropyl ether, ethylene glycol monobutyl ether, diethylene glycol monoethyl ether, butanol, methyl ethyl ketone, diacetone alcohol and the like. The organic solvent non-miscible with water may include, for example, toluene, xylene, methyl isobutyl ketone, 2-ethylhexanol and the like.

The resin composition used as the cationic electrodeposition coating composition in the present invention and in the state dispersed in the aqueous medium may be subjected to electrodeposition coating as it is, but may optionally be used as a cationic electrodeposition coating composition further containing pigment, pigment dispersant, surface active agent, ultraviolet light absorber, and other additives. The pigment may include, for example, color pigments such as titanium dioxide, carbon black, red oxide and the like; anti-corrosive pigments such as basic silicate white lead, aluminum phosphomolybdate, aluminum tripolyphosphate, strontium chromate, zinc chromate, lead chromate and the like; extender pigments such as silica, precipitating barium sulfate, aluminum silicate, precipitating calcium carbonate, talc, clay, mica and the like, and the like.

On carrying out the electrodeposition coating of the cationic electrodeposition coating composition containing, as the resin component, the resin composition for use in the electrodeposition coating composition in the present invention, a nonvolatile content of the coating composition may be controlled in the range of 15 to 25% by weight, followed by carrying out the electrodeposition coating under the conditions of a bath temperature of 15 to 35° C., and an applied voltage of 100 to 400 V taking a coating substrate such as steel plate as a cathode so as to be a dry film thickness of 10 to 50 μm, optionally washing with water, and by heat curing at 100 to 200° C., preferably 140 to 180° C. for 10 to 30 minutes to form a cured coating film.

The present invention can provide a resin composition which is used as a cationic electrodeposition coating composition and is capable of forming an electrodeposition coating film showing good properties in corrosion resistance, finish appearance and weather resistance.

EXAMPLE

The present invention is explained more in detail by the following Preparation Examples, Examples and Comparative Examples, in which "part" and "%" are represented by weight respectively.

Preparation of Amine-Modified Acrylic Resin (A)

Preparation Example 1

Before use, respective polymerizable unsaturated monomers and organic solvents were all subjected to deaeration by passing nitrogen gas therethrough for one hour.

A reactor equipped with a thermometer, thermostat, stirrer, reflux condenser, and dropping apparatus was charged with 50 parts of methyl isobutyl ketone as a solvent, followed by heating at 105° C. passing through nitrogen gas, dropping thereinto over 3 hours a mixture of 10 parts of glycidyl methacrylate and 90 parts of n-butyl methacrylate as the polymerizable unsaturated monomers, 0.005 part of bis(borondifluorodimethylglyoxymate) Co (II) as a metal complex and 2.0 parts of 2,2'-azobis(2-methylbutyronitrile) as a radical polymerization initiator, followed by leaving to stand at 105° C. for one hour, dropping over one hour 0.5 part of 2,2'-azobis(2-methylbutyronitrile) and 5 parts of methyl isobutyl ketone, and leaving to stand at 105° C. for one hour to obtain an acrylic copolymer solution, the acrylic copolymer of which had a weight average molecular weight of about 3,000, keeping the acrylic copolymer solution at 105° C., adding 7.4 parts of diethanolamine, heating at 120° C., keeping at that temperature for 5 hours, and cooling to obtain an amine-modified acrylic resin solution (A-1) having a solid content of about 66%.

Preparation Example 2

Preparation Example 1 was duplicated except that a mixture of 20 parts of 2-hydroxyethyl methacrylate and 70 parts of n-butyl methacrylate was used in place of 90 parts of n-butyl methacrylate to obtain an amine-modified acrylic resin solution (A-2) having a solid content of about 66%. The acrylic copolymer obtained as above had a weight average molecular weight of about 3,000.

Preparation Example 3

Preparation Example 1 was duplicated except that a combination of 4 parts of glycidyl methacrylate and 96 parts of n-butyl methacrylate was used in place of a combination of 10 parts of glycidyl methacrylate and 90 parts of n-butyl methacrylate, and 3.0 parts in place of 7.4 parts of diethanolamine were used to obtain an amine-modified acrylic resin solution (A-3) having a solid content of about 66%. The acrylic copolymer obtained as above had a weight average molecular weight of about 3,000.

Preparation Example 4

Preparation Example 1 was duplicated except that the amount of bis(borondifluorodimethylglyoxymate) Co(II) was changed from 0.005 part to 0.0015 part to obtain an amine-modified acrylic resin solution (A-4) having a solid content of about 66%. The acrylic copolymer obtained as above had a weight average molecular weight of about 10,000.

Preparation Example 5

Preparation Example 1 was duplicated except that 6.3 parts of N-ethylmonoethanolamine was used in place of 4 parts of diethanolamine to obtain an amine-modified acrylic resin solution (A-5) having a solid content of about 66%.

Preparation Example 6 (for Comparison)

Preparation Example 1 was duplicated except that bis(borondifluorodimethylglyoxymate) Co(II) was not used to obtain an amine-modified acrylic resin solution (A-6C) having a solid content of about 66%. The acrylic copolymer obtained as above had a weight average moleaclar weight of about 30,000.

Preparation Example 7 (for Comparison)

Preparation Example 1 was duplicated except that the combination of 10 parts of n-octylmercaptan and 0.5 part of 2,2'-azobis(2-methylbutylronitrile) was used in place of the combination of 0.005 part of bis(borondifluorodimethylglyoxymate) Co(II) and 2.0 parts of 2,2'-azobis(2-methylbutyronitrile) to obtain an amine-modified acrylic resin solution (A-7C) having a solid content of about 66%. The acrylic copolymer obtained as above had a weight average molecular weight of about 3,000.

Preparation of Blocked Polyisocyanate (B)

Preparation Example 8

A reactor equipped with a thermometer, thermostat, stirrer, reflux condenser and dropping apparatus was charged with 20 parts of methyl isobutyl ketone as a solvent, followed by adding 35 parts of tolylene diisocyanate, heating at 60° C., dropping over 2 hours 45 parts of ethylene glycol monoisopropyl ether at 60° C., heating at 80° C., and reacting so that an isocyanato group residue according to a titrimetric determination may be about zero to obtain a blocked polyisocyanate solution (B-1) having a solid content of about 77%.

Preparation of Amine-Modified Epoxy Resin

Preparation Example 9

A reactor equipped with a thermometer, thermostat, stirrer and, reflux condenser was charged with 380 parts of Epikote 828 EL (trade name, epoxy resin marketed by Yuka Shell Epoxy Co., Ltd., epoxy equivalent about 190) and 137 parts of bisphenol A, followed by adding 0.26 part of N-benzyldimethylamine while heating at 100° C., heating up to 120° C., reacting for about 2 hours, adding 120 parts of methyl isobutyl ketone, cooling down to 80° C., adding 14 parts of methylisobutylketimine solution (75% solution of methyl isobutyl ketone) of diethylenetriamine and 57 parts of N-ethylmonoethanolamine, heating up to 100° C. to react for about 5 hours, and adding 41 parts of propylene glycol monomethyl ether to obtain an amine-modified epoxy resin solution (C-1) having a solid content of about 78%.

Preparation of Pigment Dispersion

A mixture of 45 parts of titanium white, 10 parts of clay, 3 parts of a pigment dispersant (Nopcosperse 44C, water based pigment dispersant, trade name, marketed by San Nopco Ltd.) and 42 parts of diionized water was ground in a sand mill to a particle size of 10 μm or less so that the pigment may be dispersed, resulting in obtaining a pigment dispersion having a solid content of about 58%.

Examples 1–6 and Comparative Examples 1–2

A reactor equipped with a thermometer, thermostat, stirrer, reflux condenser and a vacuum evaporator was charged with respective resin solutions obtained in Preparation Examples in respective amounts as shown in Table 1, followed by carrying out desolvation under the conditions of a temperature of 70 to 80° C. and a pressure of 50 to 60 mm Hg so that the solid content may be 85% or more, and slowly introducing resulting resin solutions into a cylindrical stainless container charged with deionized water and acetic acid with thorough agitation respectively for emulsifying to obtain a resin composition emulsion having a solid content of about 30% and used as a cationic olectrodeposition coating composition. Thereafter, a mixture of 10 parts of the pigment dispersion having a solid content of about 58% as above obtained and deionized water was added to 100 parts of the emulsion having a solid content of about 30% as above obtained to obtain a celectrodeposition coating composition having a solid content of about 20% respectively.

Respective electrodeposition coating compositions obtained as above were subjected to the following tests according to the following test methods.

Test Method

Finish Appearance

Electrodeposition coating was carried out onto a cold-rolled steel test panel so as to be a dry film thickness of about 20 μm. Finish appearance of a cured coating film was evaluated from the standpoints of undulation and gloss as follows. 3: good, 2: slightly poor, 1: poor.

Weather Resistance

Electrodeposition coating was carried out onto a cold-rolled steel test panel so as to be a dry film thickness of about 20 μm. The cured test panel was subjected to accelerated 1000 hours' test by Sunshine Weather Meter. Gloss retension percentage (%) of the coating film was evaluated as follows. 3: good and gloss retension percentage is 90% or higher; 2: slightly poor and gloss retension percentage is 60% or more, but less than 90%; 1: poor and gloss retension percentage is less than 60%.

Weather Resistance

Electrodeposition coating was carried out onto a cold-rolled steel test panel so as to be a dry film thickness of about 20 μm. Crosscuts were formed onto an electrodeposition coating film of respective test panels so that cuts may reach a base material. The resulting crosscut test panels were subjected to a salt spray test for 1000 hours in accordance with JIS Z-2731. Development of rust on the electrodeposition coating film was evaluated as follows. 3: width of rust from the cut is less than 2 mm on one side; 2: width of rust from the cut is 2 mm or more, but less than 5 mm on one side; 1: width of rust from the cut is 5 mm or more on one side.

TABLE 1

|  |  | Examples | | | | | | Comparative Examples | |
|---|---|---|---|---|---|---|---|---|---|
|  |  | 1 | 2 | 3 | 4 | 5 | 6 | 1 | 2 |
| Amine-modified acrylic resin solutions | kind | A-1 | A-2 | A-3 | A-4 | A-5 | A-1 | A-6C | A-7C |
|  | amount (part) | 85 | 85 | 90 | 85 | 85 | 65 | 85 | 85 |
| Blocked polyisocyanate solution (B-1) (part) |  | 15 | 15 | 10 | 15 | 15 | 15 | 15 | 15 |
| Amine-modified epoxy resin solution (C-1) (part) |  |  |  |  |  |  | 20 |  |  |
| Test results | finish appearance | 3 | 3 | 3 | 3 | 3 | 3 | 2 | 3 |
|  | weather resistance | 3 | 3 | 3 | 3 | 3 | 3 | 3 | 3 |
|  | corrosion resistance | 3 | 3 | 3 | 3 | 3 | 3 | 3 | 1 |

What is claimed is:

1. A resin composition used in an electrodeposition coating composition and containing an amine-modified vinyl resin (A) prepared by addition reaction of a secondary amine to an epoxy group-containing vinyl copolymer obtained by copolymerizing 2 to 30 parts by weight of an epoxy group-containing polymerizable unsaturated monomer (a-1) and 70 to 98 parts by weight of other polymerizable unsaturated monomer (a-2) copolymerizable with the monomer (a-1) by a catalytic chain transfer polymerization and having a weight average molecular weight of 2,000 to 20,000, and a blocked polyisocyanate (B).

2. A resin composition as claimed in claim 1, wherein the catalytic chain transfer polymerization is carried out in the presence of a metal complex as a catalytic chain transfer agent and a radical polymerization initiator.

3. A resin composition as claimed in claim 2, wherein the metal complex is a cobalt complex.

4. A resin composition as claimed in claim 2, wherein an amount of the metal complex is in the range of $1 \times 10^{-6}$ to 1 part by weight100 parts by weight of a total amount of the epoxy group-containing polymerizable unsaturated monomer (a-1) and other polymerizable unsaturated monomer (a-2).

5. A resin composition as claimed in claim 1, wherein the secondary amine is a secondary alkanolamine.

6. A resin composition as claimed in claim 1, wherein the amine-modified vinyl resin (A) is in the range of 50 to 90 parts by weight, and the blocked polyisocyanate (B) is in the range of 10 to 50 parts by weight100 parts by weight of a total amount of the components (A) and (B).

7. A resin composition as claimed in claim 1, wherein said resin composition further contains an amine-modified epoxy resin (C).

8. A resin composition as claimed in claim 7, wherein the amine-modified epoxy resin (C) is in the range of 30 parts by weight or less100 parts by weight of a total amount of the resin (A) and blocked polyisocyanate (B).

* * * * *